(12) United States Patent
Cho

(10) Patent No.: US 8,646,205 B2
(45) Date of Patent: Feb. 11, 2014

(54) FABRICATED CULTIVATION BOX AND FABRICATED LANDSCAPE ARCHITECTURE SYSTEM

(76) Inventor: Heung-Yeul Cho, Gyeryong-si (KR)

( * ) Notice: Subject to any disclaimer, the term of this patent is extended or adjusted under 35 U.S.C. 154(b) by 245 days.

(21) Appl. No.: 13/142,016

(22) PCT Filed: Jul. 20, 2009

(86) PCT No.: PCT/KR2009/004003
§ 371 (c)(1),
(2), (4) Date: Jun. 24, 2011

(87) PCT Pub. No.: WO2010/082717
PCT Pub. Date: Jul. 22, 2010

(65) Prior Publication Data
US 2011/0252704 A1    Oct. 20, 2011

(30) Foreign Application Priority Data

Jan. 15, 2009  (KR) .................. 10-2009-0003210
Feb. 4, 2009   (WO) ............... PCT/KR2009/000539
Apr. 2, 2009   (KR) .................. 10-2009-0028440

(51) Int. Cl.
*A01G 9/02* (2006.01)

(52) U.S. Cl.
USPC .............................................. 47/66.6; 47/83

(58) Field of Classification Search
USPC .......... 47/39, 66.6, 65.5, 66.5, 67, 82, 83, 86, 47/66.1
See application file for complete search history.

(56) References Cited

U.S. PATENT DOCUMENTS 869,523 A * 10/1907 Schmidt .................. 47/66.6
2,279,735 A * 4/1942 Gates ...................... 47/33

(Continued)

FOREIGN PATENT DOCUMENTS

| CN | 2904632   | 5/2007  |
| CN | 201131202 | 10/2008 |

(Continued)

*Primary Examiner* — Rob Swiatek
*Assistant Examiner* — Ebony Evans
(74) *Attorney, Agent, or Firm* — Lexyoume IP Meister, PLLC.

(57) ABSTRACT

The present invention relates to a fabricated landscape architecture system that can simply form landscape architecture of a wall surface or the like. The fabricated landscape architecture system, includes a plurality of support plates (60), a plurality of cultivation boxes (10) and water supply pipes (30). The plurality of support plates (60) are arranged in one or more lines in a vertical or horizontal direction and include a plurality of fastening holes and pipe grooves (13). The plurality of cultivation boxes (10) are formed in the shape of a box of which one surface is open. A plurality of fastening protrusion (25) to be inserted into the fastening holes, pipe grooves (13) positioned so as to face the pipe grooves (13) of the support plates (60) and the assembly holes are formed on the bottom of the cultivation box (10). The water supply pipes (38) are provided between the pipe grooves (63) of the support plates (60) and the pipe grooves (13) of the cultivation boxes, and include a plurality of water supply protrusions.

19 Claims, 15 Drawing Sheets

(56) References Cited

U.S. PATENT DOCUMENTS

| | | | | |
|---|---|---|---|---|
| 3,464,387 | A * | 9/1969 | Martinez | 119/252 |
| 4,380,136 | A * | 4/1983 | Karpisek | 47/83 |
| 4,658,542 | A * | 4/1987 | Holmberg | 47/86 |
| 4,896,456 | A * | 1/1990 | Grant | 47/67 |
| 5,131,185 | A * | 7/1992 | Wingerden | 47/86 |
| 6,178,690 | B1 * | 1/2001 | Yoshida et al. | 47/65.9 |
| 7,231,740 | B2 * | 6/2007 | Jirele | 52/7 |
| 7,921,599 | B2 * | 4/2011 | Irwin | 47/66.1 |
| 8,250,804 | B2 * | 8/2012 | Chang | 47/39 |
| 8,281,517 | B2 * | 10/2012 | MacKenzie | 47/83 |
| 8,495,833 | B2 * | 7/2013 | Cussol et al. | 47/65.9 |
| 2010/0095586 | A1 * | 4/2010 | Sichello | 47/65.9 |
| 2011/0219689 | A1 * | 9/2011 | Hodson-Walker | 47/66.6 |
| 2011/0258925 | A1 * | 10/2011 | Baker | 47/65.8 |

FOREIGN PATENT DOCUMENTS

| | | |
|---|---|---|
| GB | 1 548 955 | 7/1979 |
| GB | 2 430 856 | 4/2007 |
| JP | 02-163012 | 6/1990 |
| JP | 05-015753 | 3/1993 |
| JP | 09-000059 | 1/1997 |
| JP | 10-225241 | 8/1998 |
| JP | 11-293689 | 10/1999 |
| JP | 2001-211752 | 8/2001 |
| JP | 2006-055176 | 3/2006 |
| JP | 2007-215516 | 8/2007 |
| JP | 2008-029322 | 2/2008 |
| KR | 20-0251157 | 10/2001 |
| KR | 10-0479212 | 3/2005 |
| WO | 88/06400 | 9/1988 |

* cited by examiner

FABRICATED CULTIVATION BOX AND FABRICATED LANDSCAPE ARCHITECTURE SYSTEM

TECHNICAL FIELD

The present invention relates to a fabricated cultivation box and a fabricated landscape architecture system. More particularly, the present invention relates to a fabricated cultivation box that allows a plurality of fabricated cultivation boxes to be simply and continuously connected to each other to simply form a module and that can be conveniently supplied with water through a water supply pipe, and a fabricated landscape architecture system.

BACKGROUND ART

In general, several pots in which flowers or trees are planted are disposed for a home, interior or exterior decoration, environment beautification, landscape architecture, and the like.

In particular, a pot support on which pots may be disposed in several stages is provided at porches of various buildings, parks, public places, roadsides, bridges, and the like. A plurality of pots are arranged on the pot support for the purpose of decoration.

Further, after a drain plate is placed on the bottom, a cultivation medium is formed on the drain plate by using artificial soil or the like. Then, flowers, trees, or the like are cultivated.

In this state, in order to water the flowers or the trees, water is periodically sprinkled on each of the pots by using watering pots, sprayers, hoses, gourds, or the like.

It is difficult to dispose conventional pots at places that are substantially perpendicular to the ground, such as a wall surface, and to arrange pots in a predetermined pattern. For this reason, it is difficult to effectively form landscape architecture.

Further, if the drain plate is placed and a cultivation medium is formed using artificial soil, the replacement of cultivated plants is difficult and very troublesome in some cases.

Further, when the conventional pot or drain plate is used, in order to replace plants with other plants, new plants should be cultivated after plants cultivated in the pot or the cultivation ground are pulled up, removed, or moved to other places, which is troublesome.

In addition, since it is not easy to supply water only to the pot or the cultivation medium when plants are watered, water flows out on a peripheral floor, so that the peripheral floor is sometimes messy or appearance is spoiled. Since a watering pot or a gourd is used to water the plants, it is difficult to accurately adjust the amount of water to be supplied. As a result, water is excessively supplied and surplus water flows out on the floor.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a fabricated cultivation box that can be easily assembled because fastening protrusions are formed on the bottom surfaces of the cultivation box, and that can have a collective water supply because pipe grooves used to fix water supply pipes are formed on the bottom of the cultivation box.

Further, the present invention provides a fabricated landscape architecture system where cultivation boxes can be arranged so as to be aligned with each other because cultivation boxes are provided on support plates so as to be continuously connected to each other, the landscape architecture environment can be simply changed by the replacement of boxes in which different plants are cultivated, and collective water supply can be conveniently performed because water supply pipes are provided between support plates and cultivation boxes.

Furthermore, the present invention provides a fabricated landscape architecture system that can easily facilitate decoration or landscape architecture of a wall surface because cultivation boxes can be provided so as to lie down.

Further, the present invention provides a fabricated landscape architecture system that can prevent sediment and the like from pouring down from cultivation boxes because the cultivation boxes are provided to be inclined upward.

In addition, the present invention provides a fabricated landscape architecture system that can supply electric power required for driving a water supply pump and the like by itself because electric power can be generated using sunlight.

Technical Solution

An exemplary embodiment of the present invention provides a fabricated cultivation box that includes a body and a plurality of fastening protrusions. The body is formed in the shape of a box, and a plurality of vents are formed on at least one side surface of the body. The plurality of fastening protrusions protrude from the bottom of the body.

The plurality of fastening protrusions may be arranged so that the longer sides thereof are orthogonal to each other.

Two to ten fastening protrusions may be arranged in a vertical or horizontal direction.

A locking piece may be formed at the end of the each of the fastening protrusions.

Further, the fabricated cultivation box according to the exemplary embodiment of the present invention may further include: one or more fastening protrusions that protrude from two adjacent side surfaces of the body so as to have a predetermined length in a height direction; and one or more groove protrusions that are formed at corresponding positions on two side surfaces facing the side surfaces on which the fastening protrusions are formed so as to have a predetermined length in a height direction, and each includes a fastening groove into which the fastening protrusion is inserted.

A pipe groove where a water supply pipe is positioned and one or more assembly holes connected to the pipe groove may be formed on the bottom of the body.

Furthermore, another exemplary embodiment of the present invention provides a fabricated landscape architecture system that includes a plurality of support plates, a plurality of cultivation boxes, and water supply pipes. The plurality of support plates are arranged in one or more lines in a vertical or horizontal direction, and include a plurality of fastening holes and pipe grooves. The plurality of cultivation boxes are formed in the shape of a box of which one surface is open. A plurality of fastening protrusions to be inserted into the fastening holes, pipe grooves positioned so as to face the pipe grooves of the support plates, and the assembly holes are formed on the bottom of the cultivation box. The water supply pipes are provided between the pipe grooves of the support plates and the pipe grooves of the cultivation boxes, and include a plurality of water supply protrusions.

The open end and/or bottom of the cultivation box may be formed as an inclined plane.

One surface of the support plate facing the bottom of the cultivation box may be formed in the shape of a step.

The fabricated landscape architecture system may further include a ring-shaped frame that is provided on the circumference of the plurality of support plates.

The fabricated landscape architecture system according to the other exemplary embodiment of the present invention may further include a water supply device, and the water supply device includes a water source that supplies water, a main water supplying pipe that supplies water in the water source to the water supply pipe and having a water control valve installed therein, a drain pipe that is connected to an end of the water supply pipe and connected to the ground or a drainage and having a drain control valve installed therein, a temperature measurer installed in the support plate, a rainfall sensor installed in the support plate, and a controller that supplies a control signal to the water supply control valve and the drain control valve according to signals input from the temperature measurer and the rainfall sensor.

When the measured value input from the temperature measurer is lower than a predetermined temperature (e.g., 0° C., 5° C., 10° C., or 15° C.), the controller applies a control signal to change the water supply control valve to the close state and simultaneously applies a controls signal to change the drain control valve to the open state so as to drain water remaining in the water supply pipe of the landscape architecture system.

When the measured value input from the temperature measurer is higher than the predetermined temperature (e.g., 0° C., 5° C., 10° C., or 15° C.), the controller applies a control signal to change the water supply control valve to the open state and simultaneously applies a control signal to change the drain control valve to the close state so as to normally supply water to the landscape architecture system.

The controller applies a control to change the water supply control valve to the close state without regard to the measured value input from the temperature measurer when a signal indicating rain is input from the rainfall sensor.

The controller maintains control according to the measured value input from the temperature measurer when the signal indicating rain is not input from the rainfall sensor.

In addition, according to the other exemplary embodiment of the present invention, the fabricated landscape architecture system may further include a pump installed between the water source and the main water supply pipe and a self-generation device that supplies power to the pump.

The self-generation device includes a solar cell module, a storage battery electrically connected to the solar cell module, and an inverter electrically connected to the storage battery.

Advantageous Effects

According to the exemplary embodiment of the present invention, the assembled cultivation box and the fabricated landscape architecture system can be easily assembled in anyplace where the landscape gardening or indoor/outdoor decoration are required, such as parks, a veranda, a bridge, roadside verges, in front of buildings, a wall surface or wall body, a ceiling, a signboard, or an indoor partition.

In addition, according to the exemplary embodiment of the present invention, separation or replacement of a specific cultivation box can be easily performed and therefore landscape gardening or indoor/outdoor decoration can be easily and simply changed by replacing a cultivation box where various flowers and trees are cultivated.

In addition, according to the exemplary embodiment of the present invention, a cultivation box and a support are provided in various standard size so that a user can easily perform landscape architecture of indoor/outdoor decoration or change decoration by purchasing a standard sized product and attaching/detecting the product as the user desires.

Further, according to the exemplary embodiment of the present invention, the fabricated cultivation box and the fabricated landscape architecture system may be provided as a set package of a support and a cultivation box according to a user's order or may be unpackaged and sequentially fabricated for user-desired landscape architecture on a job site or a predetermined installation location, and may be provided by job order production.

According to the exemplary embodiment of the present invention, the fabricated cultivation box and the fabricated landscape architecture system enable water supply through a water supply pipe so that a watering job becomes very convenient and the amount of water supply can be controlled.

According to the exemplary embodiment of the present invention, an entry of the cultivation box can be maintained higher than the ground when the cultivation box is installed in parallel with the ground so that earth and sand can be prevented from being drained out from the cultivation box, the plant can be stably grown, and the root can be firmly supported.

According to the exemplary embodiment of the present invention, the cultivation box may be installed in the state that the cultivation box is parallely raid down and slightly inclined so that landscape architecture can be provided on a vertical surface. Therefore, that landscape architecture using plants may be provided in buildings, a high-rise house, a breast wall, an embankment, or a wall surface of an underground roadway, and buildings and a fine view of a city can be formed nature-friendly.

Further, radiation can be effectively blocked and heat insulation can be improved by finishing a wall surface or a roof of a building by using the fabricated landscape architecture system according to the exemplary embodiment of the present invention so that cooling and heating energy expense of he building can be reduced and energy can be reduced environment-friendly.

In the fabricated landscape architecture system according to the exemplary embodiment of the present invention, water remaining in the water supply pipe can be drained when the temperature is below 0° C. so that damage to the water supply pipe due to a frost can be effectively prevented.

In addition, the fabricated landscape architecture system according to the exemplary embodiment of the present invention can minimize waste of water and prevent excessive water supply to a cultivated plant.

In addition, the fabricated landscape architecture system according to the exemplary embodiment of the present invention can automatically control water supply by sensing a temperature or a rainfall so that additional manpower for water supply management is not required, and maintenance of the water supply can be easily performed in a remote place through periodic checking.

Further, according to the exemplary embodiment of the present invention, electricity can be self-generated by using sunlight or wind force so that power for driving a water supply device such as a controller and a pump or a lighting device can be self-supplied.

BEST MODE FOR CARRYING OUT THE INVENTION

Preferred exemplary embodiments of a fabricated cultivation box and a fabricated landscape architecture system according to the present invention will be described in detail below with reference to the drawings.

Figure 1:
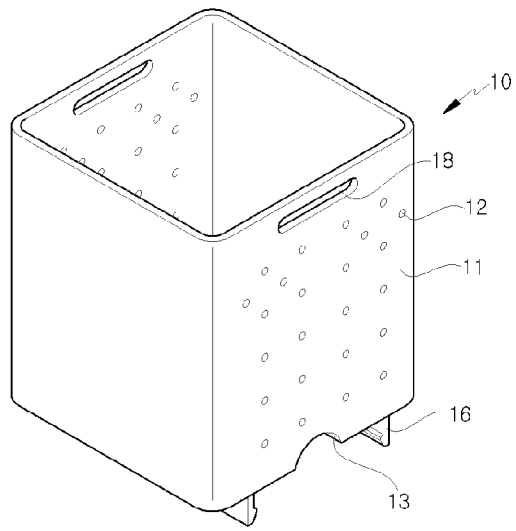
FIG. 1 is a perspective view of a fabricated cultivation box according to a first exemplary embodiment of the present invention.
Figure 2:
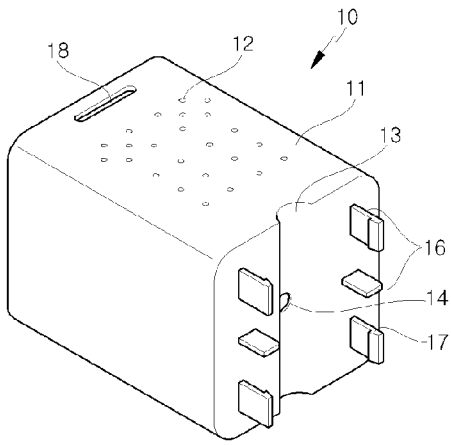
FIG. 2 is a bottom perspective view of the fabricated cultivation box according to the first exemplary embodiment of the present invention.

First, as shown in FIGS. 1 and 2, a first exemplary embodiment of a fabricated cultivation box according to the present invention includes a body 11 and a plurality of fastening protrusions 16 that protrude from the bottom of the body 11. The body is formed in the shape of a box of which one end is open, and a plurality of vents 12 are formed on side surfaces of the body.

The body 11 is made of a material such as a synthetic resin, so as to be light and have excellent strength.

The body 11 is shown to be formed in the shape of a rectangular box, but it may be formed in various shapes, such as a cylindrical shape, a hexagonal shape, and an oval shape.

The length of one side or the diameter of the body 11 may be set to be various, and for example is in the range of about 3 cm to 1 m.

About two to ten fastening protrusions 16 are arranged on the bottom of the body 11 at predetermined intervals in a vertical or horizontal direction.

As shown in FIG. 2, the fastening protrusions 16 are arranged so that the longer sides (i.e, widths) thereof are orthogonal to each other.

For example, if one fastening protrusion 16 is arranged so that the longer side thereof corresponds to the vertical direction when each of the fastening protrusions 16 is formed in a rectangular shape that has a small thickness and a long width, the other fastening protrusion 16 is arranged so that the longer side thereof corresponds to the horizontal direction.

As shown in FIGS. 1, 2, 8, and 13, a pipe groove 13 where a water supply pipe 30 is positioned may be formed on the bottom of the body 11.

The pipe groove 13 is formed in a substantially semicircular shape so that substantially half of the water supply pipe 30 is inserted into the pipe groove.

An assembly hole 14 into which a water supply protrusion 32 of the water supply pipe 30 is fitted is formed in the pipe groove 13.

Figure 3:
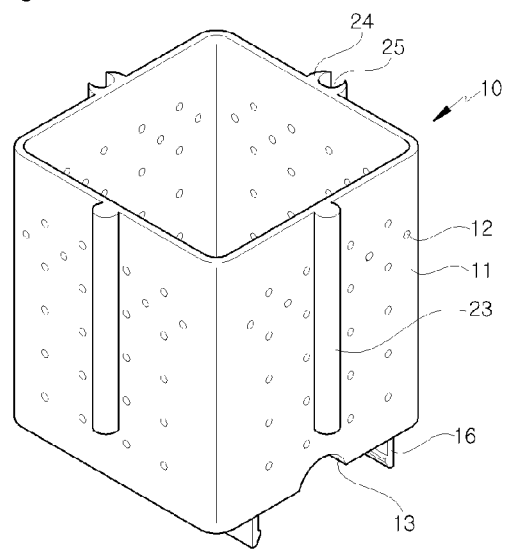
FIG. 3 is a perspective view of a fabricated cultivation box according to a second exemplary embodiment of the present invention.
Figure 4:
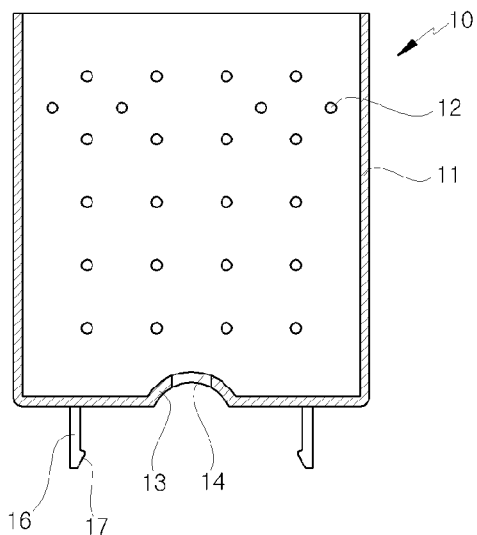
FIG. 4 is a front view of the fabricated cultivation box according to the second exemplary embodiment of the present invention.
Figure 5:
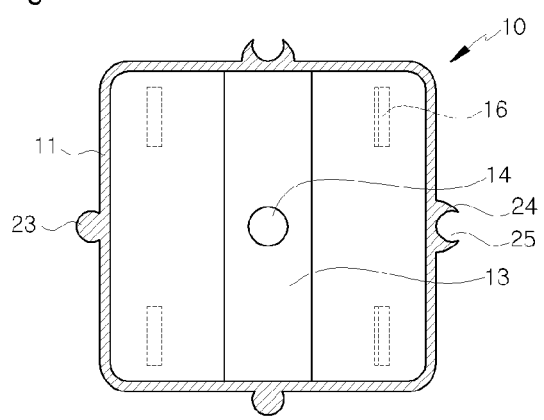
FIG. 5 is a cross-sectional view of the fabricated cultivation box according to the second exemplary embodiment of the present invention.

Further, as shown in FIGS. 3 to 5, in a second exemplary embodiment of the fabricated cultivation box according to the present invention, a fastening protrusion 23 is formed on one side surfaces of the body 11, and a groove protrusion 24 corresponding to the fastening protrusion 23 is formed on another side surface thereof.

For example, if the body 11 is formed in the shape of a rectangular box, one or more fastening protrusions 23 are formed on two adjacent side surfaces and one or more groove protrusions 24 are formed at corresponding positions on two side surfaces facing the side surfaces on which the fastening protrusions 23 are formed.

The fastening protrusion 23 protrudes from the side surface of the body 11 so as to have a predetermined length in a height direction.

The groove protrusion 24 protrudes from the side surface of the body 11 so as to have a predetermined length in a height direction, and has a fastening groove 25 into which the fastening protrusion 23 is inserted.

The fastening protrusion 23 is formed substantially in the shape of a cylinder or a quadrangular prism, and one or about two to three fastening protrusions are formed on each of the side surfaces of the body 11.

The groove protrusion 24 having the fastening groove 25 is formed at a position corresponding to the position of the fastening protrusion 23 that is formed on the opposite side surface of the body 11, and the fastening groove 25 is formed in the shape corresponding to the shape of the fastening protrusion 23.

Further, as shown in FIGS. 1 and 3, a plurality of vents 12 may be formed on at least one side surface of the body 11.

The number, size, and interval of the vents 12 are determined so that a sufficient amount of oxygen is supplied to the vents and water can pass therethrough (e.g., water drawing off).

In this case, cloth or a net may be provided in the vent 12 to prevent sediment (artificial soil, sand, earth, and the like) from flowing out.

Figure 6:
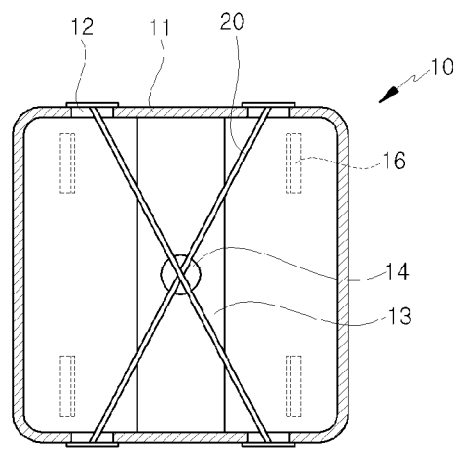
FIG. 6 is a top plan cross-sectional view of the fabricated cultivation box according to the second exemplary embodiment of the present invention.

Further, as shown in FIG. 6, two or more root support straps 20 may be provided in a diagonal direction at the vents 12 that are formed on the side surfaces of the body 11 facing each other.

If the root support straps 20 are provided as described above, the roots of plants to be cultivated, such as flowers or trees, grow around the root support straps 20 and become entangled with each other so as to be firmly supported. Accordingly, even if the cultivation box is provided in a lateral direction or upside down, earth or the like does not fall and plants can be grown in such a state. Therefore, it is possible to put the fabricated cultivation box according to the present invention on the floor, the wall, or the ceiling.

Although not shown in the drawing, holes for ventilation and/or drainage may be formed at the bottom of the body 11.

As shown in FIGS. 1 and 2, handle openings 18 may be formed on a pair of side surfaces of the body 11 that face each other.

Each of the handle openings 11 are formed in the shape of an oval or a track, and are formed near the open end of the body 10.

Figure 7:
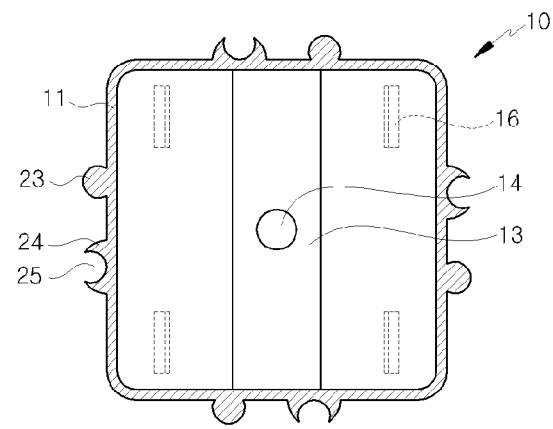
FIG. 7 is a top plan cross-sectional view of a fabricated cultivation box according to a third exemplary embodiment of the present invention.

Further, in a third exemplary embodiment of the fabricated cultivation box according to the present invention, the fastening groove 23 and the groove protrusion 24 are formed on each of the side surfaces of the body 11, as shown in FIG. 7.

In this case, if the fastening protrusions 23 and the groove protrusions 24 that are formed on the side surfaces are formed at the same positions for every 90, the positions of the fastening protrusion 23 or the groove protrusion 24 do not need to be checked during assembly, which is very convenient.

Further, it is preferable that the pipe groove 13 is formed in the shape of a cross so that the water supply pipe 30 is naturally inserted into the pipe groove even when the body is rotated by 90 so as to be assembled.

Figure 8:
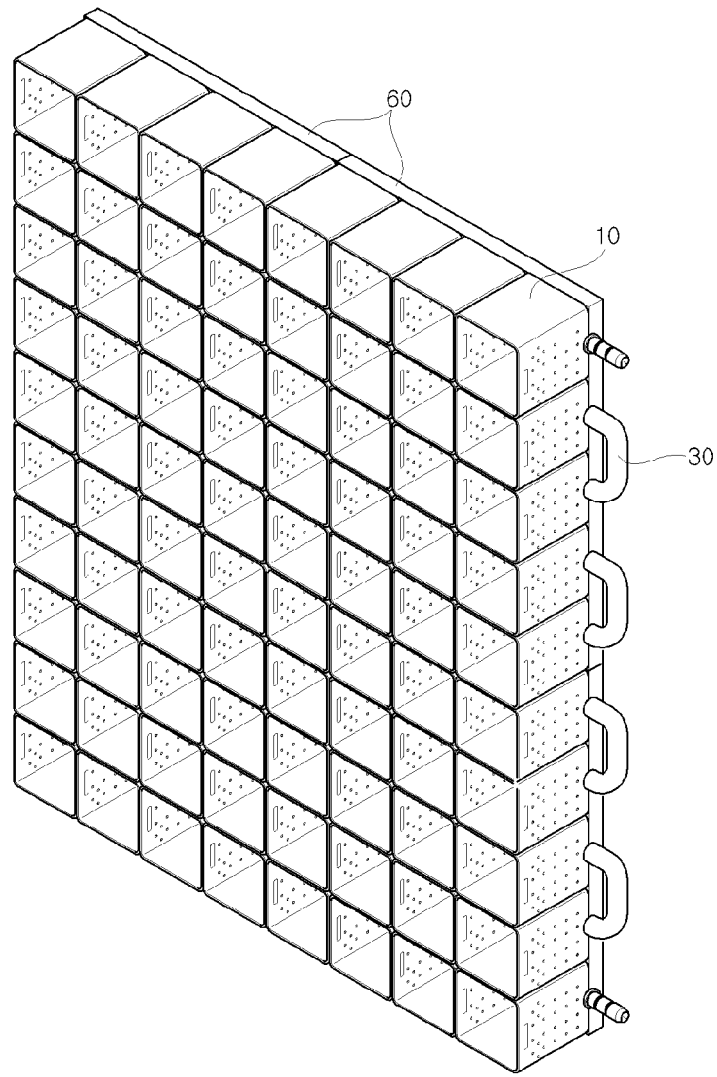
FIG. 8 is a perspective of a fabricated landscape architecture system according to a fourth exemplary embodiment of the present invention.
Figure 9:
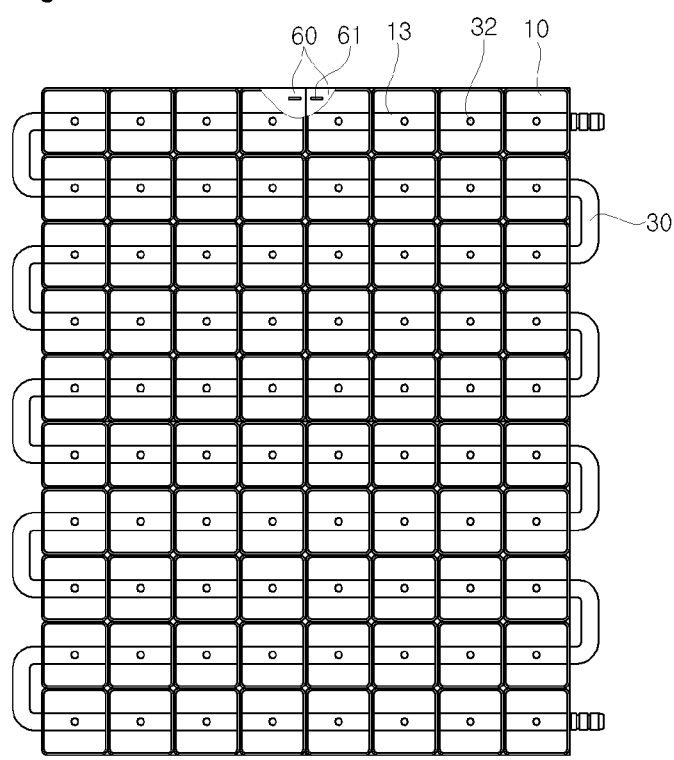
FIG. 9 is a front view of the fabricated landscape architecture system according to a fourth exemplary embodiment of the present invention.
Figure 10:
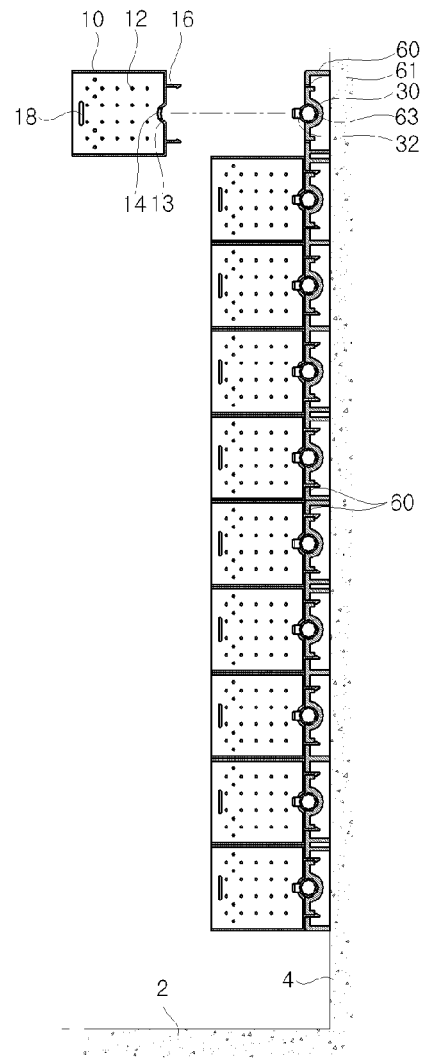
FIG. 10 is a side cross-sectional view of the fabricated landscape architecture system according to a fourth exemplary embodiment of the present invention.

Furthermore, a first exemplary embodiment of a fabricated landscape architecture system according to the present invention includes a plurality of cultivation boxes 2, support plates 60, and water supply pipes 30 as shown in FIGS. 8 to 10.

The support plates 60 may be fixed to the ground 2 or a wall surface 4 that is perpendicular to the bottom surface of the building.

In this case, the first to third exemplary embodiments of the fabricated cultivation box 10 according to the present invention may be applied as the cultivation box. Therefore, a detailed description thereof will be omitted.

A plurality of fastening holes 61 into which the fastening protrusions 16 of the cultivation box 10 are inserted are formed at corresponding positions on the support plate 60.

The water supply pipes 30 are interposed between the cultivation boxes 10 and the support plates 60.

The water supply pipes 30 are arranged on the support plates 60 at predetermined intervals (for example at intervals corresponding to the size of the cultivation box 10).

A plurality of water supply protrusions 32, which are used to supply water, protrude from the water supply pipe 30.

Figure 11:
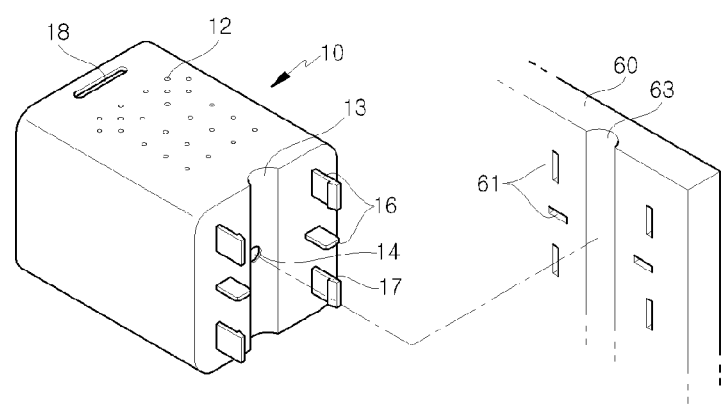
FIG. 11 is an exploded perspective view of a cultivation box and a support plate that representing the fabricated landscape architecture system according to a fourth exemplary embodiment of the present invention.
Figure 12:
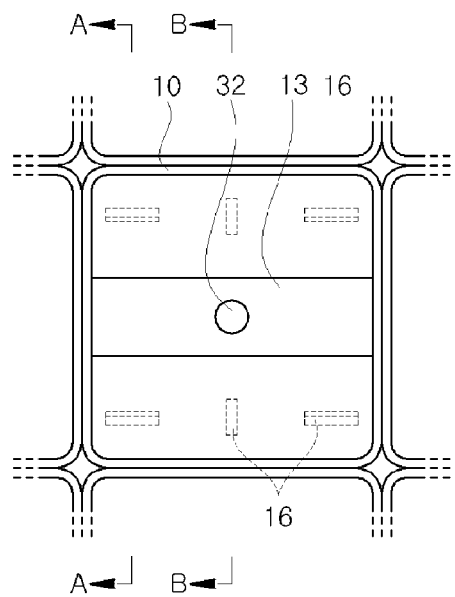
FIG. 12 is a partially enlarged front view of the fabricated landscape architecture system according to a fourth exemplary embodiment of the present invention.
Figure 13:
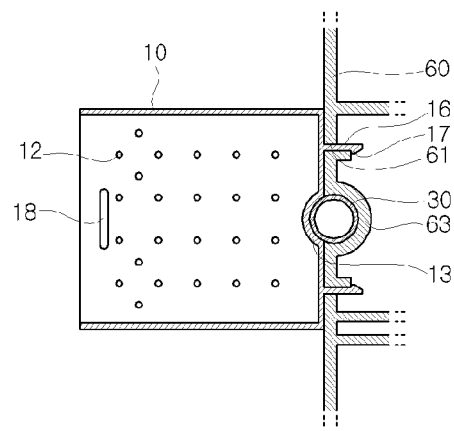
FIG. 13 is a cross-sectional view of FIG. 12, taken along the line A-A.

As shown in FIGS. 11 and 13, the fastening protrusions 16 of the cultivation boxes 10 are respectively inserted into the fastening holes 61 of the support plate 60. That is, the fastening protrusions 16 and the fastening holes 61 are positioned so as to correspond to each other.

In this case, about two to ten fastening protrusions 16 are formed at one cultivation box 10, and fastening holes 61 of which the number corresponds to the number of the fastening protrusions are formed at the support plate 60.

If the fastening protrusions 16 formed in a rectangular column shape at one cultivation box 10 are formed so that the longer widths thereof are orthogonal to each other, a force is supported in a direction corresponding to the longer side of the fastening protrusion both when an external force is applied in a vertical direction and when an external force is applied in a horizontal direction. For this reason, a constant resisting force can be maintained, and it is possible to prevent the fastening protrusions 16 from be easily broken by an external force due to existence of at least one fastening protrusion 16 located in a direction that is perpendicular to a direction of the external force. As a result, the cultivation box 10 does not easily tip and fall down.

The fastening protrusions 16 may be formed at the edges and/or corners of the bottom of the cultivation box 10.

A locking piece 17 may be formed at the end of the each of the fastening protrusions 16 so as to be locked to the fastening hole 61 and retained while being inserted into the fastening hole 61.

If the locking piece 17 is formed as described above, the fastening protrusion 16 is difficult to be separated when inserted into the fastening hole 61. Therefore, when the cultivation box 10 is provided in a lateral direction (when the cultivation box is provided on a wall surface perpendicular to the ground), the locking strength between the support plate 60 and the cultivation box is excellently maintained.

In this case, it is preferable for the locking pieces 17 to be formed only at the fastening protrusions 16 arranged in the same direction. For example, it is preferable for the locking pieces to be formed only at the fastening protrusions 16 of which the longer widths are arranged in the horizontal direction or only at the fastening protrusions 16 of which the longer sides are arranged in the vertical direction. The reason for this is that the cultivation box 10 is therefore easily separated from the support plate 60 for the purpose of replacement or maintenance thereof.

The pipe groove 13 having a substantially semicircular shape is formed on the bottom of the cultivation box 10 so that substantially half of the water supply pipe 30 is inserted into the pipe groove, as shown in FIGS. 11 to 14.

An assembly hole 14 to which a water supply protrusion 32 of the water supply pipe 30 is fitted is formed in the pipe groove 13.

Figure 15:
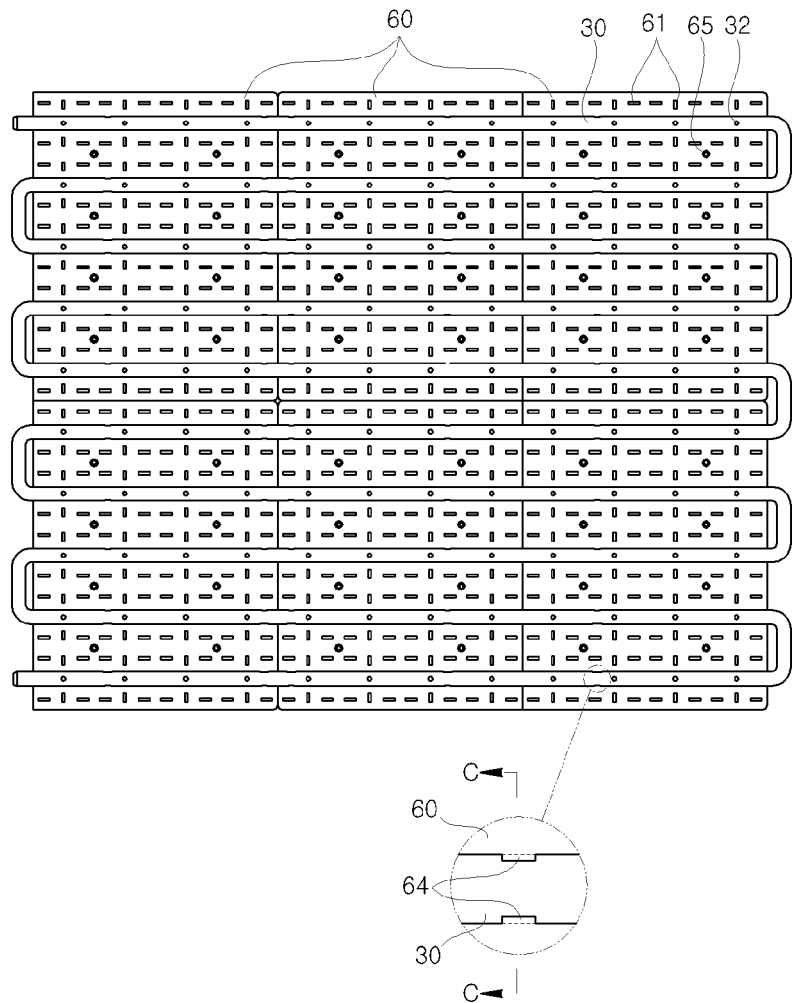
FIG. 15 is a front view of the support plate and a water supply pipe in the fabricated landscape architecture system according to a fourth exemplary embodiment of the present invention.

As shown in FIG. 15, the plurality of support plates 60 are arranged in vertical and horizontal directions.

Each support plate 60 has an area corresponding to a multiple of an area of the cultivation box 10 so that a plurality of cultivation boxes 10 are arranged in vertical and horizontal directions and assembled on one support plate 60.

Although not shown in the drawing, the area of the support plate 60 may be equal to that of the cultivation box 10.

Pipe grooves 63 into which the water supply pipes 30 are inserted are formed on one surface (front surface) of the support plate 60.

The pipe grooves 63 formed on the support plate 60 are formed in a substantially semicircular shape.

In this case, when coming in contact with each other so as to face each other, the pipe groove 13 of the cultivation box 10 and the pipe groove 63 of the support plate 60 form a cylindrical shape so that the water supply pipe 30 is positioned therebetween.

Figure 16:
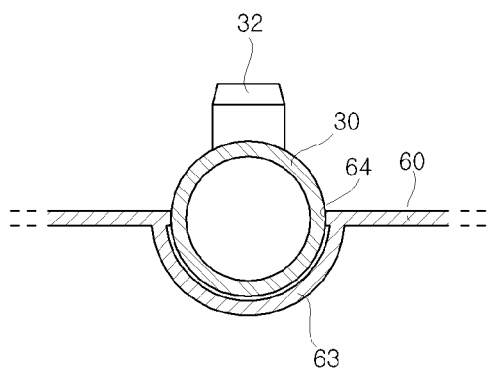
FIG. 16 is a cross-sectional view of FIG. 15, taken along the line C-C.

As shown in FIG. 16, locking protrusions 64 may be formed in the pipe groove 63 of the support plate 60 so that the water supply pipe 30 is not easily separated from the pipe groove when being inserted into the pipe groove.

Several pairs of locking protrusions 64 are formed in the pipe groove in a longitudinal direction of the pipe groove 63 so that each of the pairs of locking protrusions face each other at an open end of the pipe groove.

Although not shown in the drawing, the locking protrusions 64 may also be formed in the pipe groove 13 of the cultivation box 10 so that the water supply pipe 30 is not easily separated from the pipe groove when being inserted into the pipe groove.

A plurality of fixing holes 65, which are used to fix the support plate to a wall surface 4 by anchor bolts or screws, may be formed at the support plate 60 at predetermined intervals.

As shown in FIGS. 8 and 9, the water supply pipes 30 may be connected to each other in series so as to form one line as a whole, and may be connected to each other in parallel.

The water supply protrusions 32 of the water supply pipe 30 may protrude from the water supply pipe at predetermined intervals so that one or two water supply protrusions are disposed at each of the cultivation boxes 10.

The upper surface of the water supply protrusion 32 may be open so that water flows out through the upper surface, or a plurality of holes may be formed on the side surface of the water supply protrusion so that water flows out through the side surface. Alternatively, the water supply protrusion may be formed so that water flows out through the upper and side surfaces.

Figure 14:
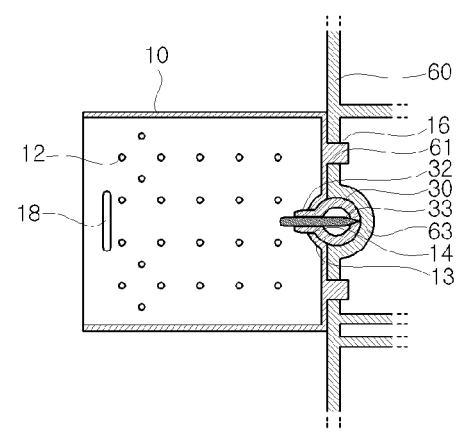
FIG. 14 is a cross-sectional view of FIG. 12, taken along the line B-B.

In this case, wicks 33, which are partially exposed to the cultivation boxes 10 through the water supply protrusions 32 as shown in FIG. 14, may be provided in the water supply pipe 30.

Each of the wicks 33 is formed in the shape of porous fiber so as to absorb and maintain water in the supply pipe 30, or is formed in the shape of a thin and long cylinder.

Each of the wicks 33 is provided so as to cross the inner space of the water supply pipe 30 from the water supply protrusion 32 in a radial direction.

If the wicks 33 are provided as described above, water existing in the water supply pipe 30 is supplied to the cultivation box 10 due to capillary forces of the wicks 33. Accordingly, there is provided a system where the water of the water supply pipe 30 is continuously and automatically supplied if moisture existing in the cultivation box 10 is used or evaporated.

As described, if water is supplied by a process that automatically supplies water by the capillary forces of the wicks 33, the waste of water is minimized, and the water of the water supply pipe 30 is not excessively supplied to the cultivation box 10 and does not flow to the outside.

Although not shown in the drawing, the water supply pipe 30 is connected to a tap to which water is supplied, a water tank, a river, a waterway, or the like when being used.

A valve, which is used to adjust the amount of supplied water and to determine whether to supply water, may be provided on the water supply pipe 30, and a water supply pump for pumping or circulating water may be provided on the water supply pipe.

In this case, an end of the water supply pipe 30, which is opposite to the end connected to the tap, the water tank, or the like, may be closed so that water does not flow to the outside or may be connected to a sinkhole so that surplus water is discharged. Alternatively, the water supply pipe may be formed so that water is circulated.

A time switch may be connected to the valve or the water supply pump so that the amount of supplied water flowing through the water supply pipe 30 is automatically adjusted.

The support plates 60, which are adjacent to each other in vertical and horizontal directions, may be connected to each other by using the water supply pipes 30 as a medium.

Figure 17:
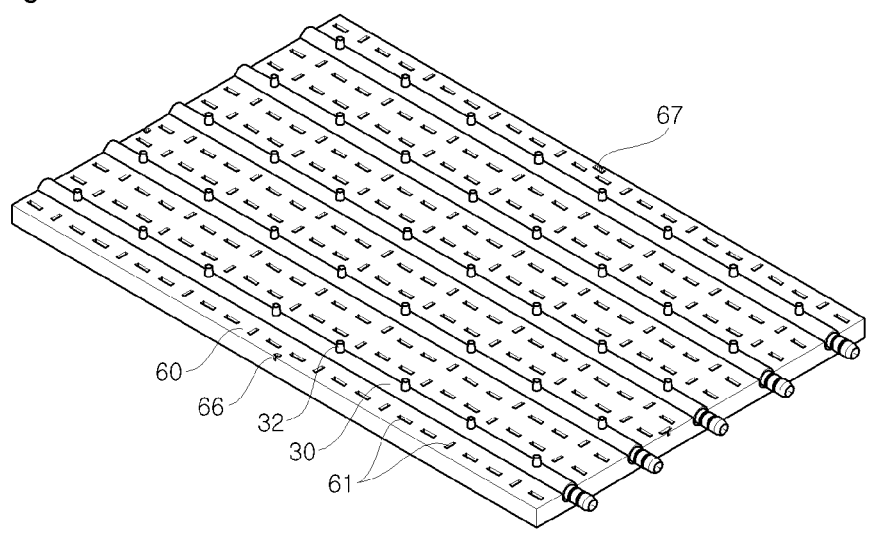
FIG. 17 is a perspective view of a set formed of the support plate and the water supply pipe of the fabricated landscape architecture system according to a fourth exemplary embodiment of the present invention.

The support plates 60 and the water supply pipes 30 may be provided as one set where the support plates 60 and the water supply pipes 30 are arranged and integrated so as to correspond to a predetermined area (for example, 1 to 100 $m^2$) as shown in FIG. 17.

If the support plates 60 and the water supply pipes 30 are provided as a set as described above, it is very convenient for a worker to assemble the support plates and the water supply pipes in the assembly line.

Figure 18:
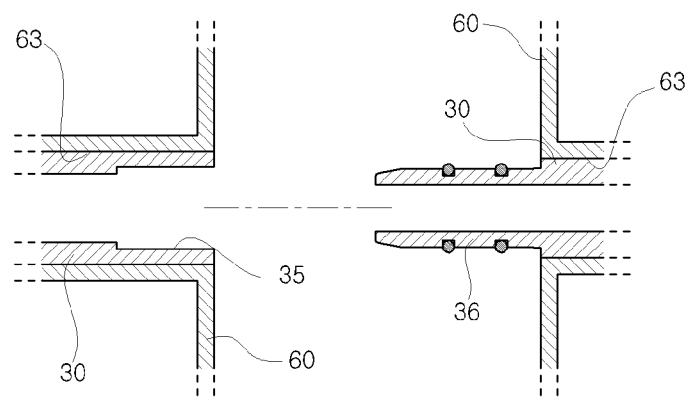
FIG. 18 is a partially enlarged cross-sectional view of a connection of a plurality of water supply pipes of the fabricated landscape architecture system according to a fourth exemplary embodiment of the present invention.

As shown in FIG. 18, a female assembly portion 35 may be formed at one end of the water supply pipe 30 that is provided on each of the support plates 60 adjacent to each other, and a male assembly portion 36 to be assembled with the female assembly portion 35 may be formed at the other end thereof so that the water supply pipes are conveniently assembled and connected to each other.

Figure 19:
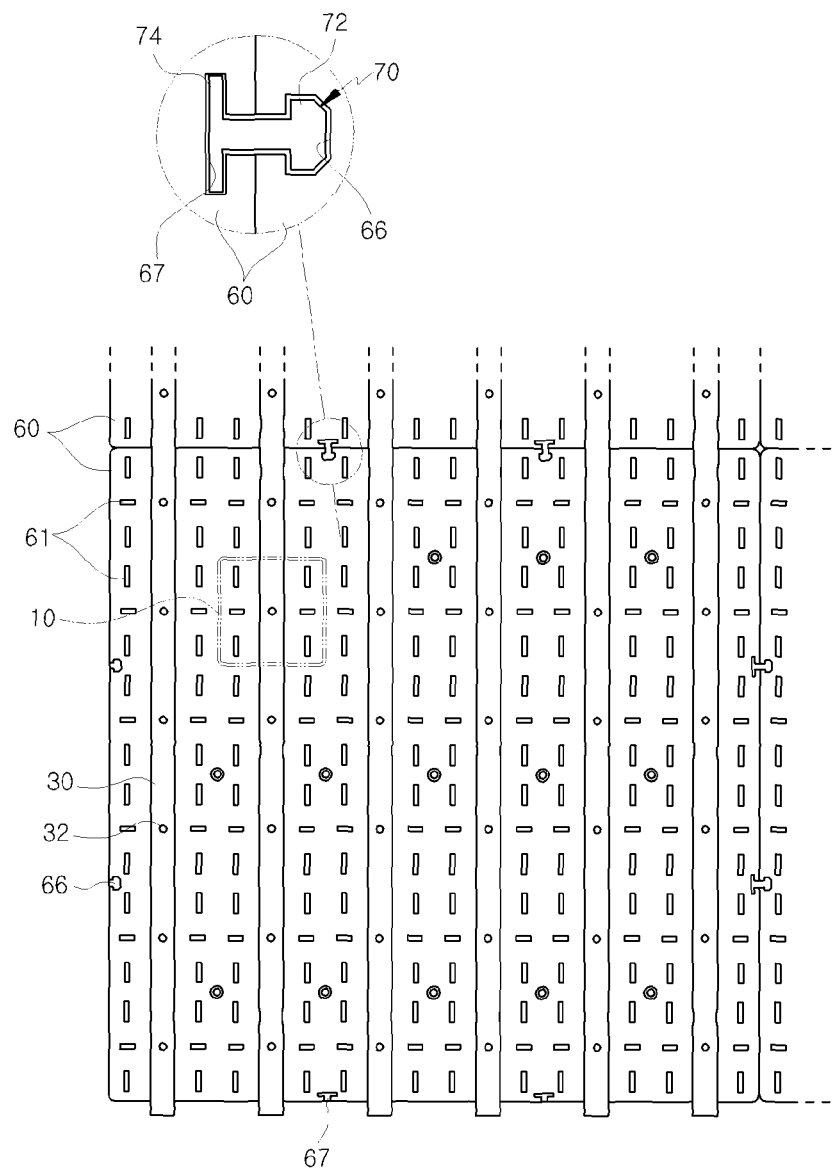
FIG. 19 is a front view of a connection state of the support plate by using a connection hole in the fabricated landscape architecture system according to a fourth exemplary embodiment of the present invention.

In the first exemplary embodiment of the fabricated landscape architecture system according to the present invention that has the above-mentioned structure, connecting grooves 66 and 67 may be formed at the edges of the support plate 60 and connectors 70 may be inserted into the connecting grooves 66 and 67, as shown in FIG. 19. Accordingly, it is possible to assemble and connect the support plates 60 that are adjacent to each other in vertical and horizontal directions.

For example, the connector 70 formed of a pair of parallel portions 72 and 74 that are integrally connected in an "H" shape with a predetermined gap therebetween. One parallel portion 72 is inserted into the connecting groove 66 of the support plate 60 and the other parallel portion is inserted into the connecting groove 67 of the other support plate 60.

When the connector 70 is formed as the "H" shape, the connected support plates 60 are not easily separated when they are pulled at both sides since the pair or parallel portions 72 and 74 are respectively inserted into the connecting grooves 66 and 67.

Figure 20:
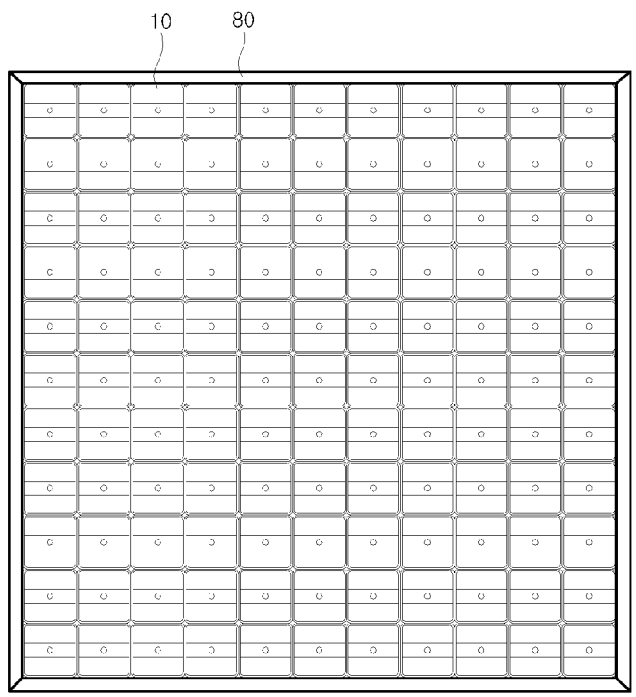
FIG. 20 is a front view of a state that a frame is installed in the fabricated landscape architecture system according to a fourth exemplary embodiment of the present invention.
Figure 21:
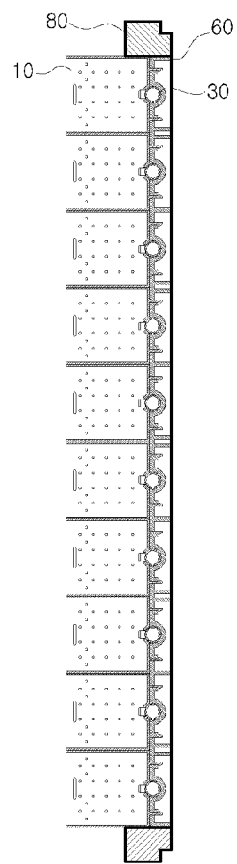
FIG. 21 is a side cross-sectional view of the state that the frame is installed in the fabricated landscape architecture system according to a fourth exemplary embodiment of the present invention.
Figure 22:
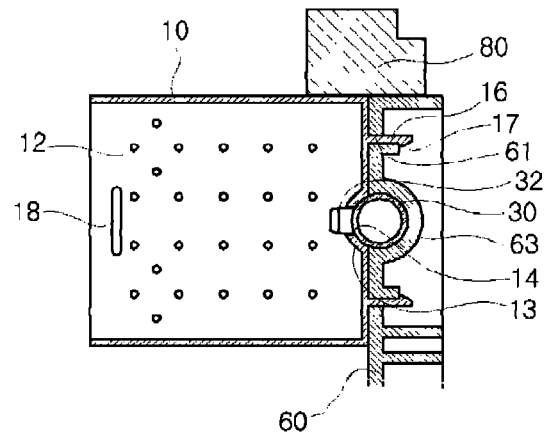
FIG. 22 is a partially enlarged cross-sectional view of the frame in the fabricated landscape architecture system according to a fourth exemplary embodiment of the present invention.

The fourth exemplary embodiment of the fabricated landscape architecture system according to the present invention having the above-mentioned structure may further include a frame 80 that is provided to form a rim along the circumference of the plurality of support plates 60, as shown in FIGS. 20 to 22.

The frame 80 may be fixed to the support plates 60 or to the wall surface 4 on which the frame is provided.

The frame 80 may be formed in various shapes, such as in the shape of a rectangular ring, in accordance with the shape of the rim of the plurality of support plates 60.

Figure 23:
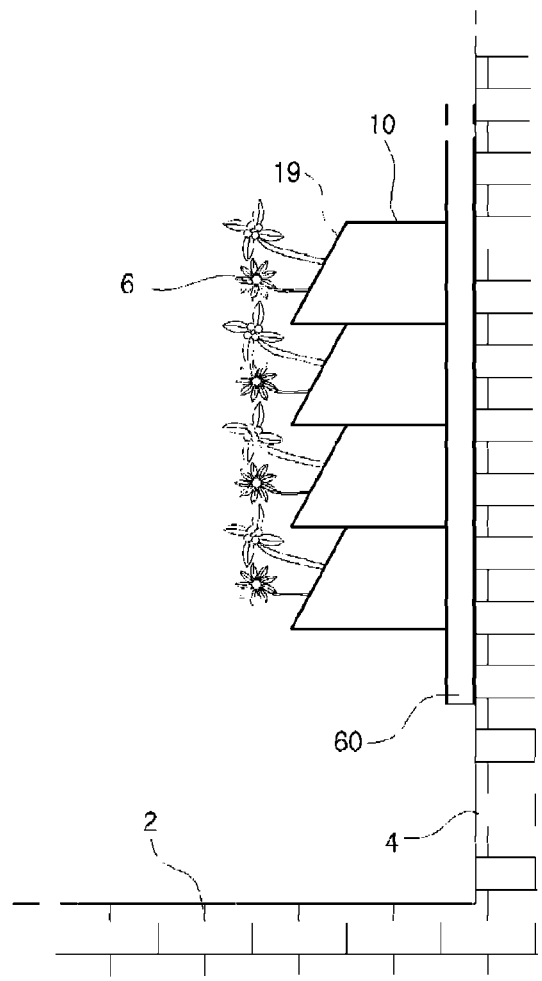
FIG. 23 is a side view of a cultivation box and a support plate of a fabricated landscape architecture system according to a fifth exemplary embodiment of the present invention.

Further, in a fifth exemplary embodiment of the fabricated landscape architecture system according to the present invention, an open end (entrance end) 19 of each of the cultivation boxes 10 may be inclined plane, as shown in FIG. 23.

The open end 19 of the cultivation box 10 is formed of an inclined plane that is inclined with respect to a vertical plane by an angle of about 3 to 60.

If the open end 19 of the cultivation box 10 is formed of an inclined plane as described above, it is possible to prevent sediment, gravel, and the like from pouring down from the cultivation boxes 10 when the support plate 60 is provided on the wall surface 4 so as to make one surface (front surface) of the support plate perpendicular to the ground 2 and the cultivation boxes 10 are provided in a lateral direction so as to be horizontal to the ground 2. Further, the cultivated plants 6 can be stably supported in the cultivation boxes 10, and plants 6 can be grown in parallel or upward.

Since the structure of the second exemplary embodiment may be the same as that of the first exemplary embodiment except for the above-mentioned structure, a detailed description thereof will be omitted.

Figure 24:
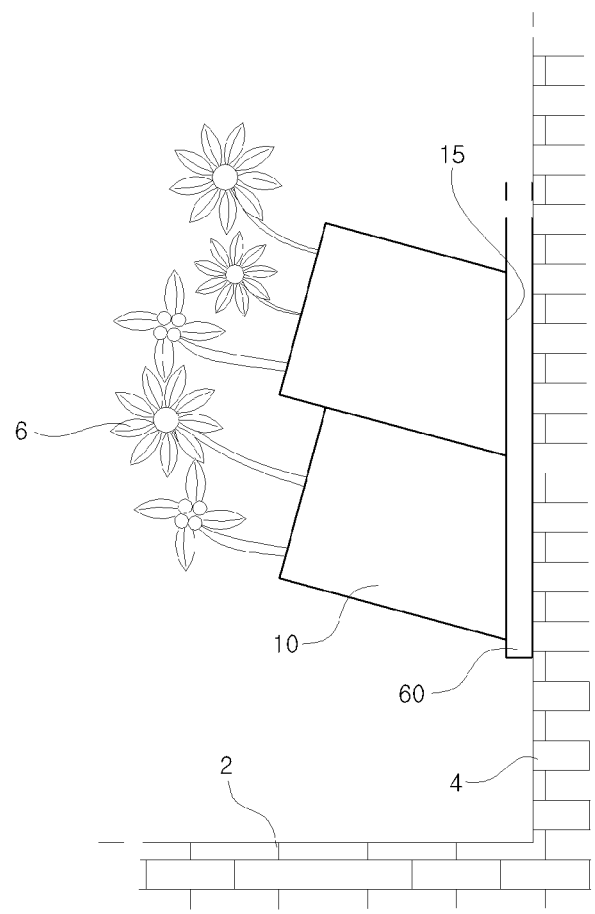
FIG. 24 is a side view of a cultivation box and a support plate of a fabricated landscape architecture system according to a sixth exemplary embodiment of the present invention.

Further, in a sixth exemplary embodiment of the fabricated landscape architecture system according to the present invention, the bottom 15 of each of the cultivation boxes 10 is formed of an inclined plane, as shown in FIG. 24.

The bottom 15 is formed so that the cultivation box 10 is inclined with respect to one surface (vertical plane) of the support plate 60 by an angle of about 3 to 60.

If the bottom 15 of the cultivation box 10 is formed of an inclined plane as described above, the open end of the cultivation box 10 is positioned higher than the bottom 15 when the support plate 60 is provided on the wall surface 4 so as to make one surface of the support plate 60 perpendicular to the ground 2 and when the cultivation boxes 10 are provided in a lateral direction. Accordingly, it is possible to reliably prevent sediment, gravel, and the like from pouring down from the cultivation boxes 10. Further, the cultivated plants 6 can be stably supported in the cultivation boxes 10, and plants 6 can be grown upward.

Since the structure of the sixth exemplary embodiment may be the same as that of the fourth exemplary embodiment except for the above-mentioned structure, a detailed description thereof will be omitted.

Figure 25:
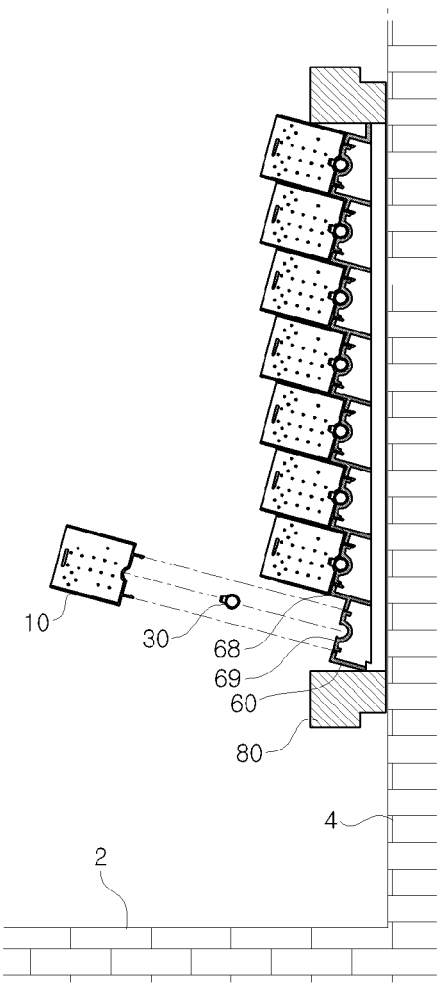
FIG. 25 is a side cross-sectional view of a fabricated landscape architecture system according to a seventh exemplary embodiment of the present invention.
Figure 26:
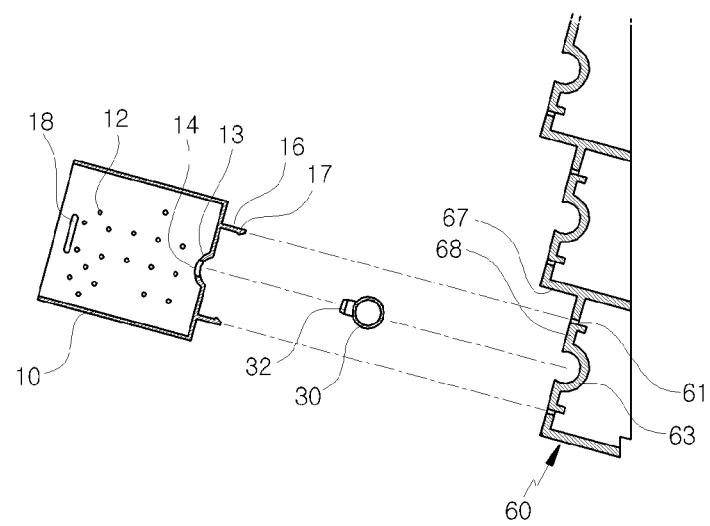
FIG. 26 is a partially enlarged cross-sectional view of the fabricated landscape architecture system according to the seventh exemplary embodiment of the present invention.

Further, in a seventh exemplary embodiment of the fabricated landscape architecture system according to the present invention, one surface (front surface) of each of the support plates 60 may be formed in the shape of a step, as shown in FIGS. 25 and 26.

For example, one surface of the support plate 60 is formed of a plurality of inclined planes 69 that are divided from each other by steps 68 and that are continuously formed.

The inclined plane 69 is formed so that the cultivation box 10 is inclined with respect to one surface (vertical plane) of the support plate 60 by an angle of about 3 to 60.

If one surface of the support plate 60 is formed in the shape of a step as described above, even though the open end 19 or the bottom 15 of the cultivation box 10 is not formed of an inclined plane, the open end 19 of the cultivation box 10 is positioned higher than the bottom 15 when the cultivation box 10 is provided in a lateral direction. Accordingly, it is possible to reliably prevent sediment, gravel, and the like from pouring down the cultivation boxes 10. Further, the cultivated plants 6 can be stably supported in the cultivation boxes, and plants 6 can be grown upward.

Since the structure of the fourth exemplary embodiment may be the same as that of the first exemplary embodiment except for the above-mentioned structure, a detailed description thereof will be omitted.

In the fifth to seventh exemplary embodiments, if the inclined planes that are formed at the open end (entrance end) 19 and the bottom 15 of each of the cultivation boxes 10 and the inclined planes 69 that are formed on one surface of the support plate 60 (on which the cultivation box 10 is assembled) are formed to be inclined with respect to the vertical plane by an angle smaller than 3, an advantage of the inclined plane is not sufficiently obtained. If the inclined planes and the inclined planes are formed to be inclined with respect to the vertical plane by an angle exceeding 60, an area of the exposed side surface is increased, which causes problems in that decoration aspect deteriorates and an advantage of the landscape architecture of the wall surface deteriorates.

Figure 27:
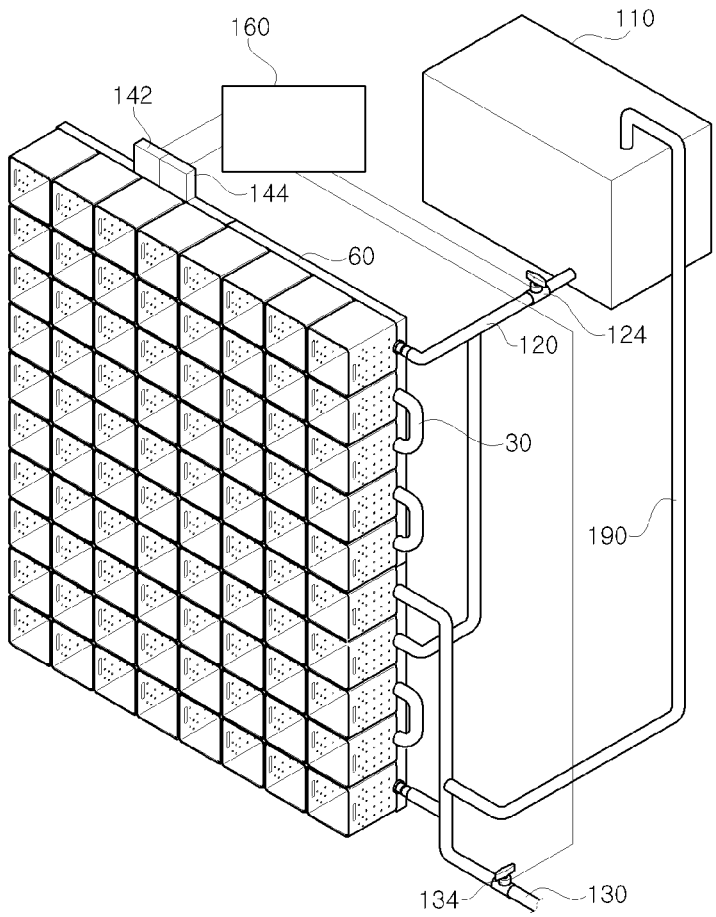
FIG. 27 is a perspective view of a fabricated landscape architecture system according to an eighth exemplary embodiment of the present invention.
Figure 28:
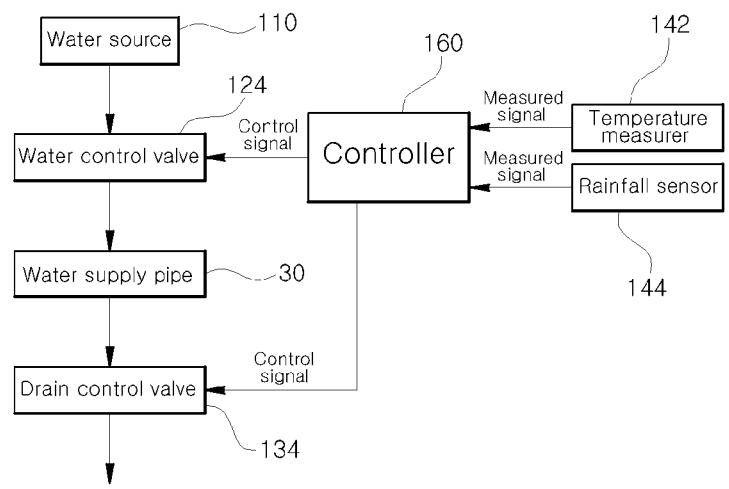
FIG. 28 is a block diagram of an exemplary water providing device of the fabricated landscape architecture system according to the eighth exemplary embodiment of the present invention.

In addition, the fabricated landscape architecture system according to the eighth exemplary embodiment of the present invention further includes a water supply device 100 that supplies water to the water supply pipe 30 as shown in FIG. 27 and FIG. 28.

The water supply device 30 includes a water source 110, a main water supply pipe 120, a drain pipe 130, a temperature measurer 142, a rainfall sensor 144, and a controller 160.

As the water source 110, a water tank that stores water for supplying water to plants (lawn, grass, flowers, small bushes, tall trees, vegetables, or fruits, etc.) cultivated in the cultivation box 10, a water pipe, or a ground water pipe may be used.

Nutritive substance for the plants in the cultivation box 10 may be added in water supplied from the water source 110 as necessary.

When the water tank is used as the water source 110, the water tank may be located higher than the cultivation box 10 so that the water can move to the water pipe 4 by gravity.

The main water supply pipe 120 includes a water control valve 124. The water control valve 124 may be automatically controlled by a control signal, and it is preferred to form the water control value 124 by using a solenoid valve.

The main water supply pipe 12 connects the water source 110 and the water supply pipe 30.

Water of the water source 110 is supplied to the water supply pipe 30 through the main water supply pipe 120.

The drain pipe 130 includes a drain control valve 134. It is preferred to form the drain control valve 134 by using a solenoid value for automatic control of the drain control valve 134 with a control signal.

The drain pipe 130 is connected to an end portion of the water supply pipe 30 and water is drained to the ground, a drain, or a drainage.

The water remaining in the water supply pipe 30 is drained out to the ground or the drain through the drain pipe 130.

As shown in FIG. 27, a drainpipe 190 may be installed before the drain control valve 134 of the drain pipe 130 is installed.

The drainpipe 190 exchanges water of the water pipe 30 to the water supply pipe 30 for reuse of the water.

The temperature measurer 142 is installed in one side of the support plate 60 or the frame 80 to measure temperature of an area where the cultivation boxes 10 are installed.

The temperature measurer 142 includes a temperature sensor, and it is preferred to include a digital temperature sensor to efficiently transmit a measured temperature to the controller 160.

The rainfall sensor 144 is installed in one side of the support plate 60 or the frame 80 and senses a rainfall (whether rain falls or not) in the area where the cultivation boxes 10 are installed.

The rainfall sensor 144 includes a rainfall measurer or a rainfall sensor.

The temperature measurer 142 and the rainfall sensor 144 may be provided as a set in one substrate.

The controller 160 applies a control signal to the water control valve 124 and the drain control valve 134 according to a measured signal input from the temperature measurer 142 and the rainfall sensor 144.

For example, the controller 160 controls a water supply state that water of the water source 110 is supplied to the water supply pipe 30 by opening the water control valve 124 and a drain state that water remaining in the water supply pipe 30 by closing the water control valve 124 and opening the drain control valve 134 according to measured signals from the temperature measurer 142 and the rainfall sensor 144.

When the measured temperature input from the temperature measurer 142 is lower than a predetermined temperature (e.g., 0° C.), the controller applies a control signal to the water control valve 124 to change the water control valve 124 to the close state and applies a control signal to the drain control valve 134 to change the drain control valve 134 to the open state.

As described, when the drain control valve 134 is changed to the drain state and the controller 160 applies a control signal, water remaining in the water supply pipe 30 is drained through the drain pipe 130 while the water supply to the water supply pipe 30 is blocked. Accordingly, damage (e.g., frost damage) to the water supply pipe 30 due to frozen water inside the water supply pipe 30 may be prevented.

In addition, the controller 160 applies a control signal to change the water control valve 124 to the open state when the measured value input from the temperature measurer 142 is higher than the predetermined temperature (e.g., 0° C.) and applies a control signal to change the drain control valve 134 to the close state. In this case, when the water supplied from the water source 110 is naturally generated water (e.g., spring water, a stream, or river water, etc.) so that it can be continuously supplied, it is possible not to change the drain control valve 134 to the close state.

As described, when the drain control valve 134 is changed to the drain state and the controller 160 applies a control signal, water is supplied to the water supply pipe 30.

Although the controller 160 controls the valves with reference to the freezing point or water, which is 0° C., the controller 160 may control the valves to block water supply when the temperature is low (e.g., below than 5° C., 10° C., or 15° C.) so that the plants do not substantially need water.

In addition, when the plant cultivated in the cultivation boxes 10 is, for example, a cactus or the like so that consistent water supply is not required, a timer (not shown) may be connected to the controller 160 for periodic control (e.g., for each time, daily, or each week) of water supply.

When a signal indicating the rain environment is input from the rainfall sensor 144, the controller 160 applies a control signal for changing the water control valve 124 to the close state.

The controller 160 applies the control signal for changing the water control valve 124 to the close state when receiving the signal indicating the rain environment from the rainfall sensor 144 without regard to a measured temperature value input from the temperature measurer 142.

That is, since there is no need of watering the cultivated plant when it rains, the water control valve 124 of the main water supply pipe 120 that supplies water to the water supply pipe 30 is changed to the close state.

When the water control valve 124 is closed by a rainfall signal input from the rainfall sensor 144, the drain control valve 134 may be changed to the open state or may be maintained in the close state. For example, when it rains, water may remain in the water supply pipe 30 or water in the water supply pipe 30 may be drained.

When the water supply pipe 30 is filled with water, the rainwater is soaked into the cultivation space of the cultivation boxes 10 so that water may not be sufficiently drained. In this case, it is preferable to drain water in the water supply pipe 30 by opening the drain control valve 134.

For example, as in the case that the a measured temperature value that is lower than a predetermined temperature is input from the temperature measurer 142, the controller 160 may be set to change to the drain state when a measured signal input from the rainfall sensor 144 indicates the rain environment.

When a signal indicating the rain environment is not input from the rainfall sensor 144, the controller 160 controlling the drain control valve 134 according to a measured temperature value input from the temperature measurer 142.

For example, when a signal indicating raining is input and then a signal indicating not raining is input from the rainfall sensor 144, the controller 160 applies a control signal that changes to the open state from the close state to the water control valve 124.

As described, the controller 160 applies a control signal corresponding to a measured signal of the rainfall sensor 144 so that unnecessary water waste can be minimized by blocking water supply of the water supply pipe 30 in the rain environment. That is, when it rains, the plants cultivated in the cultivation boxes 10 or soil can absorb water from the rain, addition water supply is not necessary.

The controller 160 may be set to control a valve open degree of the water control valve 124 in order to control the amount water supply according to a temperature measured by the temperature measurer 142.

For example, the controller 160 controls the open degree of the water control valve 124 to the maximum level to maintain a sufficient amount of water supply when the temperature measured by the temperature measurer 142 is higher than 30° C., and controls the open degree between the middle and the maximum level to maintain the amount of water supply in a middle range. In addition, when the temperature measured by the temperature measurer 142 is between 15° C. to 25° C., the controller 160 controls the open degree of the water control valve 124 between the minimum to the middle level to maintain a small amount of water supply.

When the water control valve 124 is changed to the open state with low water pressure, water in the water supply pipe 30 is consumed according to the amount of water that the plant cultivated in the cultivation boxes 10 absorbs from the soil and accordingly water supply can be naturally performed.

In the controller 160, a normal water supply state implies not only that the water control valve 124 is changed to the open state but also that the amount of water supply is regulatively or continuously controlled accordingly to the amount of water consumed by the plant cultivated in the cultivation boxes 10.

For example, in the water supply state, the controller 160 may be set to control the open degree of the water control valve 124 between the minimum and the maximum level according to the amount of water consumption, and the open and close of the water control valve 124 may be set to be iteratively performed for a constant period (by time frame, day frame, week frame, or month frame) to control the amount of water supply.

In the above description, the water supply device according to the exemplary embodiment of the present invention is applied to a fabricated landscape architecture system, but the present invention is not limited thereto. The water supply according to the present invention may be applied to various water culture devices such as a seedling production system or a water culture system.

Figure 29:
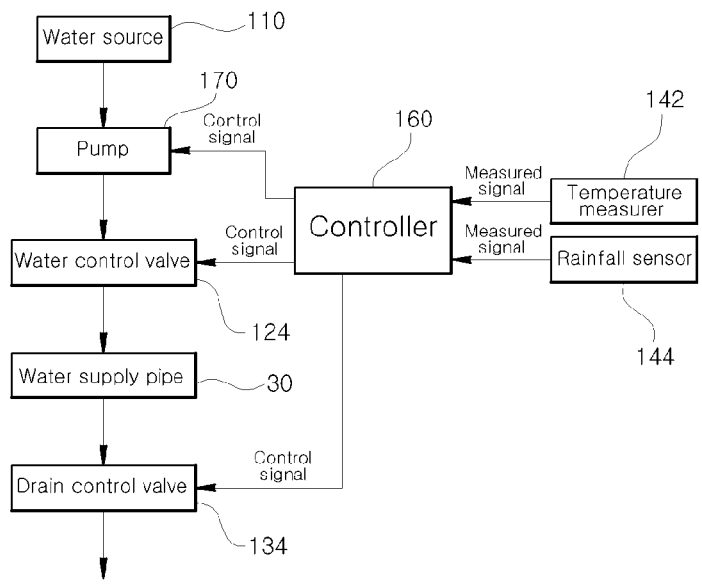
FIG. 29 is a block diagram of another exemplary water providing device of the fabricated landscape architecture system according to the eighth exemplary embodiment of the present invention.

In addition, in the fabricated landscape architecture system according to the eighth exemplary embodiment of the present invention, another exemplarily water supply device includes a pump 170 between the water source 110 and the main water supply pipe 120 as shown in FIG. 29.

When the pump 170 is provided, the height of the water source 110 (e.g., the height of the water tank) can be freely set without regard to the height of the support plate 60 on which the cultivation boxes 10 is installed.

The pump 170 is set to operate according to a control signal applied from the controller 160.

The controller 160 applies a control signal to stop operation of the pump 170 when the water control valve 124 is changed to the close state, and applies a control signal to start operation of the pump 170 when the water control valve 124 is changed to the open state.

Since the water supply is limited when the pump 170 does not operate even though the water control valve 124 is changed to the open state, the controller 160 may be set to control operation of the pump 170 to control the amount of water supply.

Figure 30:
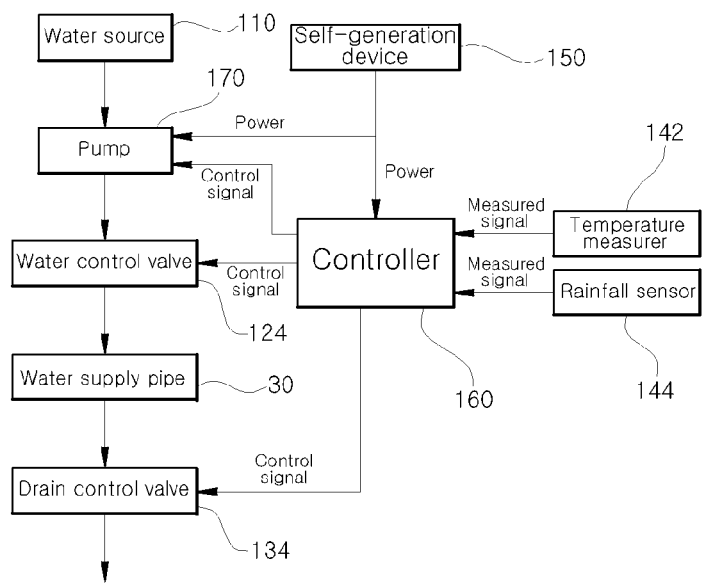
FIG. 30 is a block diagram of another exemplary water providing device of the fabricated landscape architecture system according to the eighth exemplary embodiment of the present invention.
Figure 31:
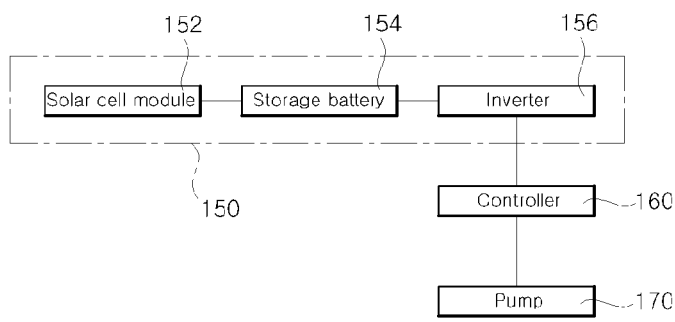
FIG. 31 is a block diagram of a self-generating unit of the fabricated landscape architecture system according to the eighth exemplary embodiment of the present invention.

In addition, in the fabricated landscape architecture system according to the eighth exemplary embodiment of the present invention, another exemplarily water supply device further includes a self-generation device 150 that generates power with sunlight, solar heat, wind force, and water power and supplies the power to the controller 160 and the pump 170 by generating power with between the water source 110 and the main water supply pipe 120 as shown in FIG. 30 and FIG. 31.

When the self-generation device 150 is provided, an automatic control function can be effectively maintained in the case that the cultivation boxes 10 are installed in the external environment for a long period of time, and the cultivation boxes 10 can be effectively installed and managed in an area or place having a difficulty in power supply. For example, when the cultivation boxes 10 are installed on an advertising plate or a wall surface of a structure, the cultivation boxes 10 can be supplied with power through the powers of nature so that the landscape architecture system can be effectively managed.

The self-generation device 150 includes a solar cell module 152, a storage battery 154 that is electrically connected to the solar cell module 152, and an inverter 156 that is electrically connected to the storage battery 154.

Although not shown in the drawing, like a solar cell module that is generally and widely used, the solar cell module 152 is formed of the same structure of a solar cell module used for a general sunlight generation.

The solar cell module 152 is obliquely positioned at a predetermined height so as to be easily irradiated with sunlight.

The inverter 156 converts a 12 to 24V-DC voltage of the storage battery 154 into a 220V-AC voltage. That is, when the pump 170 uses an AC voltage, it is preferable to install an inverter 156.

The inverter 156 is connected to the controller 160 that controls the pump 170.

If the pump 170 is a DC pump, the inverter 156 does not need to be used.

The self-generation device 150 may further includes a power stabilizer, if necessary, so as to stably supply constant electric power.

Although not shown in the drawing, the above-mentioned self-generation device 150 may be formed to supply electric power to a flow control valve, lighting equipment, or the like in addition to the pump 170 and the controller 160.

Although it is described that the self-generation device 150 uses the solar cell module 152 that generates electricity by using sunlight, the self-generation device 150 may be formed by applying a small-sized wind force generation system that generates electricity by using wind force or may be formed of the solar cell module 152 and the wind force generation system for use of both of the sunlight and wind force.

Preferred embodiments of the fabricated cultivation box and the fabricated landscape architecture system according to the present invention have been described above. However, the present invention is not limited thereto, and may have various modifications within the claims, the detailed description of the invention, and the accompanying drawings. The modifications may be within the scope and sprit of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A fabricated landscape architecture system comprising:
   a plurality of support plates that are arranged in one or more lines in a vertical or horizontal direction and include a plurality of fastening holes and pipe grooves;
   a plurality of cultivation boxes that are formed in the shape of a box of which one surface is open, a plurality of fastening protrusions inserted into the fastening holes, pipe grooves positioned so as to face the pipe grooves of the support plates, and assembly holes being formed on a bottom of the cultivation boxes; and water supply pipes that are provided between the pipe grooves of the plurality of support plates and the pipe grooves of the cultivation boxes and include a plurality of water supply protrusions.

2. The fabricated landscape architecture system of claim 1, wherein two or more fastening holes formed at the support plates and two or more fastening protrusions formed at one of the cultivation boxes are formed so as to correspond to each other, and the fastening protrusions formed at one cultivation box are arranged so that a longer side thereof are orthogonal to each other.

3. The fabricated landscape architecture system of claim 1, wherein a plurality of locking pieces are formed at an end of each of the fastening protrusions so as to be locked to the fastening holes and retained while being inserted into each fastening hole.

4. The fabricated landscape architecture system of claim 3, wherein the locking pieces are formed only at the fastening protrusions arranged in the same direction.

5. The fabricated landscape architecture system of claim 1, wherein one surface of the support plates facing the bottom of the cultivation boxes is formed in the shape of a step.

6. The fabricated landscape architecture system of claim 5, wherein one surface of the support plate is formed of inclined planes that are inclined with respect to a plane by an angle of 3 to 60° and arranged in the shape of several steps.

7. The fabricated landscape architecture system of claim 1, wherein the bottom of the cultivation box is formed as an inclined plane that is inclined with respect to a vertical plane by an angle of 3 to 60°.

8. The fabricated landscape architecture system of claim 1, wherein an open end of the cultivation box is formed as an inclined plane that is inclined with respect to a vertical plane by an angle of 3 to 60°.

9. The fabricated landscape architecture system of claim 1, further comprising a wick of which one end is exposed to each of the cultivation boxes through each of the water supply protrusions formed at the water supply pipes and the other end is provided so as to cross an inner space of each of the water supply pipes in a radial direction, a plurality of wicks supplying water flowing in the water supply pipes to the cultivation boxes.

10. The fabricated landscape architecture system of claim 1, further comprising a frame that is provided to form a rim along the circumference of the plurality of support plates.

11. The fabricated landscape architecture system of claim 1, wherein connecting grooves into which connectors for connecting a plurality of adjacent support plates are inserted are formed at corners of the support plates, the connecting grooves are formed in a H shape by integral connection of a pair of parallel portions with a predetermined gap therebetween, one of the pair of parallel portions is inserted into a connecting groove of one side of the support plates and the other of the pair of parallel portions is inserted into a connecting groove of the other side of the support plates.

12. The fabricated landscape architecture system of claim 1, wherein the water supply pipes are arranged on the support plates so as to correspond to a predetermined area, and the water supply pipes and the support plates are integrated so as to form one set.

13. The fabricated landscape architecture system of claim 1, wherein locking protrusions are formed in the pipe grooves of the support plates so that the water supply pipes are not easily separated from the pipe grooves when inserted into the pipe grooves.

14. The fabricated landscape architecture system of claim 1, wherein two or more root support straps are provided in a diagonal direction at vents that are formed on side surfaces of the cultivation boxes facing each other.

15. The fabricated landscape architecture system of claim 1, further comprising a water supply device that supplies water to the water supply pipes, wherein the water supply device includes a water source that supplies water, a main water supplying pipe that controls water is the water source to the water supply pipes and having a water control valve installed therein, a drain pipe that is connected to an end of the water supply pipes and connected to the ground or a drainage and having a drain control valve installed therein, a temperature measurer installed in the support plates, a rainfall sensor installed in the support plates, and a controller that supplies a control signal to the water supply control valve and the drain control valve according to signals input from the temperature measurer and the rainfall sensor.

16. The fabricated landscape architecture system of claim 15, wherein, when a measured value input from the temperature measurer is lower than a predetermined temperature, the controller applies a control signal to change the water control valve to a close state and simultaneously applies a control signal to change a drain control signal to an open state so as to maintain a drain state, and when the measure value input from the temperature measurer is higher than the predetermined temperature, the controller applies a control signal to change the water supply control valve to an open state and simultaneously applies a control signal to change the drain control signal to a close state so as to maintain a normal water supply state.

17. The fabricated landscape architecture system of claim 15, wherein the controller applies a control to change the water supply control valve to a close state without regard to a measured value input from the temperature measurer when a signal indicating rain is input from the rainfall sensor, and applies a control signal according to the measured value input from the temperature measurer when the signal indicating rain is not input from the rainfall sensor.

18. The fabricated landscape architecture system of claim 17, wherein a pump is installed between the water source and the main water supply pipe, and the controller applies a control signal to stop operation of the pump when the water supply control valve is changed to the close state and applies a control signal to start operation of the pump when the water supply control valve is changed to an open state.

19. The fabricated landscape architecture system of claim 15, further comprising a self-generation unit that generates electricity by using sunlight or wind force and a storage battery that changes electricity generated from the self-generation unit and supplies power to the controller.

* * * * *